(12) United States Patent
Lawson et al.

(10) Patent No.: US 6,177,648 B1
(45) Date of Patent: Jan. 23, 2001

(54) STEERED LASER BEAM SYSTEM WITH LASER POWER CONTROL

(75) Inventors: William E. Lawson, Somerset; Steven J. Roffers, Hammond; John J. Zik, Hudson, all of WI (US)

(73) Assignee: Laser Machining, Inc., Somerset, WI (US)

(*) Notice: Under 35 U.S.C. 154(b), the term of this patent shall be extended for 0 days.

(21) Appl. No.: 09/280,535

(22) Filed: Mar. 30, 1999

(51) Int. Cl.[7] .......................... B23K 26/00; B23K 26/08
(52) U.S. Cl. .................. 219/121.62; 219/121.61; 219/121.8; 219/121.81
(58) Field of Search ............... 700/166; 219/121.61, 219/121.62, 121.78, 121.8, 121.81, 121.79, 121.83; 359/201, 202, 203

(56) References Cited

U.S. PATENT DOCUMENTS

| | | | |
|---|---|---|---|
| 3,549,733 | * 12/1970 | Caddell . | |
| 3,953,706 | 4/1976 | Harris et al. | 219/121.6 |
| 4,160,894 | 7/1979 | Stemmler et al. | 219/121.6 |
| 4,874,919 | * 10/1989 | Bransden et al. | 219/121.68 |
| 5,262,612 | 11/1993 | Momany et al. | 219/121.67 |
| 5,340,962 | 8/1994 | Schmidt et al. | 219/121.78 |
| 5,428,280 | 6/1995 | Schmidt et al. | 318/568.11 |
| 5,478,426 | 12/1995 | Wiler et al. | 156/272.8 |
| 6,085,122 | * 7/2000 | Manning . | |

FOREIGN PATENT DOCUMENTS

| | | | | |
|---|---|---|---|---|
| 59-9215291 | * 12/1984 | (JP) | | 219/121.78 |
| 60-130490 | * 7/1985 | (JP) | | 219/121.8 |
| 61-229488 | * 10/1986 | (JP) | | 219/121.61 |
| 62-270291 | * 11/1987 | (JP) | | 219/121.61 |
| 1-104486 | * 4/1989 | (JP) | | 219/121.81 |

* cited by examiner

Primary Examiner—Geoffrey S. Evans
(74) Attorney, Agent, or Firm—Kinney & Lange, P.A.

(57) ABSTRACT

An improved method for operating a steered laser beam system employs selective laser power control. A laser beam is provided having a selectively positionable focal point. A workpiece is provided on which a selected laser beam pattern is used to process the workpiece, and the laser beam focal point is controlled to travel along the selected pattern at varying velocities. A position of the focal point on the workpiece is dynamically determined as the focal point travels along the selected pattern. A velocity of the focal point on the workpiece is dynamically calculated based on multiple determined positions of the focal point. An energy level of the laser beam is controlled based on the calculated velocity of the focal point. In one embodiment, the energy level of the laser beam is adjusted to maintain a constant energy per unit distance traveled by the focal point.

11 Claims, 5 Drawing Sheets

STEERED LASER BEAM SYSTEM WITH LASER POWER CONTROL

BACKGROUND OF THE INVENTION

The present invention relates to steered laser beam systems that perform work on a workpiece, and more particularly to a method for operating a steered laser beam system employing selective laser power control based on a velocity of the laser beam focal point.

Laser systems are presently being used as supplements or alternatives to other machining processes. Typically, such laser systems use high-power laser beams for cutting, welding and surface treatment of materials. Laser beam cutting is presently considered a standard industrial process.

In many applications, the table on which the workpiece(s) is disposed is moved in two dimensions with respect to a laser beam that is stationary. This technology is often referred to as an "x-y table" laser system. However, such systems are typically only able to achieve relatively slow movement, and therefore are inefficient for many applications.

Steered or directed laser beam systems have been developed for applications in which workpieces need to be processed at a high speed to be economical. Such steered or directed laser beams are well known and use linear motors or operate using a "galvo system". A galvo system employs two or more mirrors for reflecting the laser beam in a controlled path to selectively position the focal point of the laser beam on the workpiece. The reflective angles of the mirrors are adjusted, typically under computer control, to alter the position of the focal point of the laser beam in two (or more) dimensions.

Figure 1:
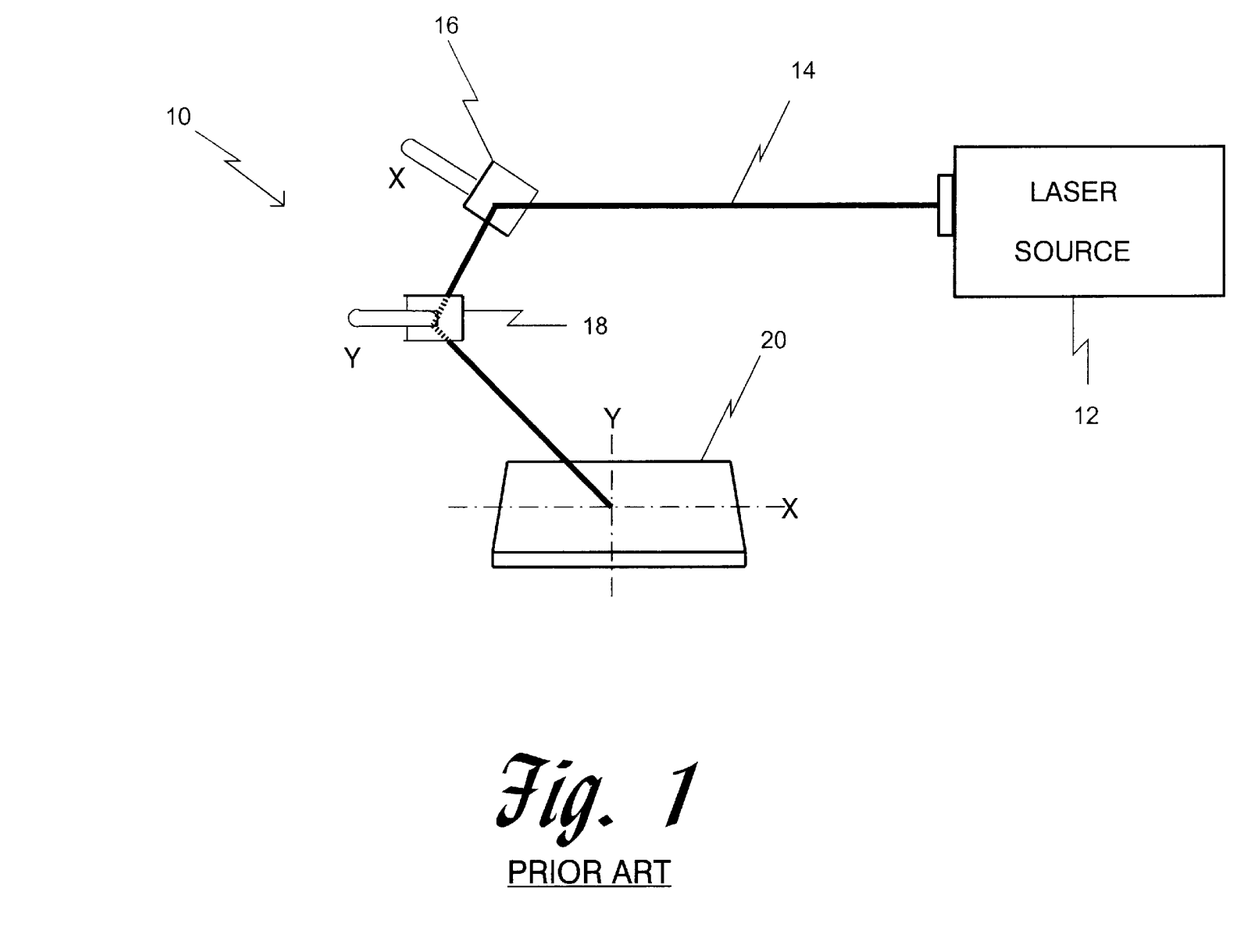
FIG. 1 is a diagram simplistically illustrating a prior art steered laser system employing a galvo mirror system arrangement.

FIG. 1 is a diagram simplistically illustrating a typical prior art galvo steered laser beam system 10. Galvo system 10 includes laser source 12 emitting laser beam 14. Galvo mirrors 16 and 18 are provided and arranged to control the "x" (horizontal) position and the "y" (vertical) position, respectively, of the focal point of laser beam 14 on workpiece 20. This position control is achieved by adjusting the reflectance angles of mirrors 16 and 18. For an application involving complex cutting pattern, mirrors 16 and 18 are typically under computer control, and velocities of the focal point of laser beam 14 may exceed 100 in/sec in some applications.

One problem associated with using a steered laser beam system in a cutting process is obtaining a uniform depth of cut or a uniform score when such systems are operated at high speeds, where the focal point is moving at times with velocities above about 100 in/sec. The basis of the problem is the fact that at high speeds, a uniform focal point velocity cannot be maintained for cutting patterns having shaped features such as curves and corners. The focal point velocity must decrease in order to traverse curves and corners, and then is able to return to full velocity on straight portions of the cutting pattern. The difficulty of the non-uniform velocity profile is that with uniform power applied to the laser beam, a deeper cut will be made where the laser beam focal point is traveling at lower velocities (corners and curves) than will be made where the laser beam focal point is traveling at higher velocities (straight portions). In addition, at the beginning of a cut, the galvo mirrors are not able to instantaneously reach a high enough velocity to turn the laser on, and when the laser finally does turn on, the laser power tends to spike up to an undesirably high power level, resulting in too deep and wide of a cut at the starting location.

Figure 2:
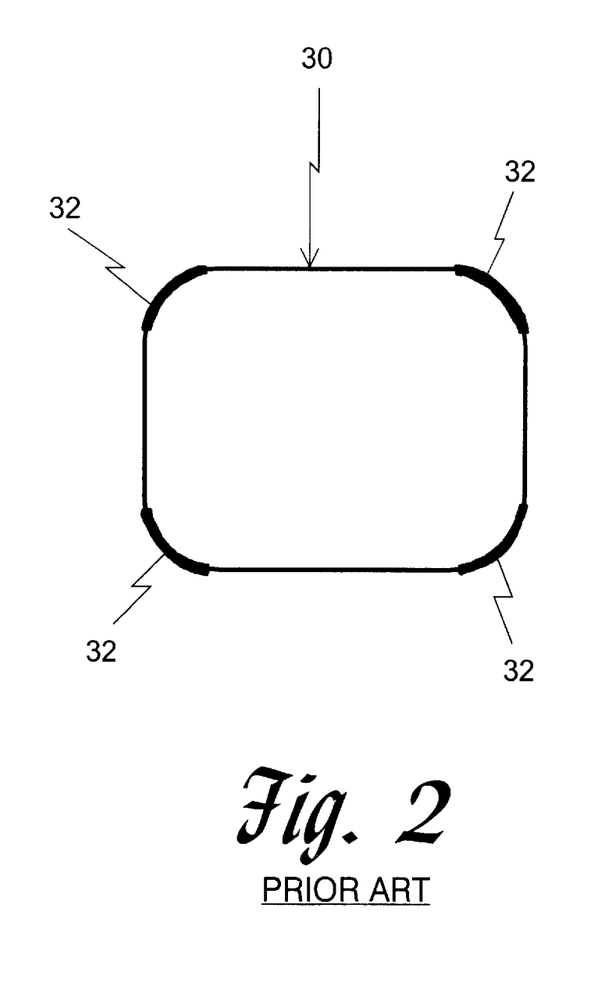
FIG. 2 is a diagram illustrating an exemplary cutting pattern application performed by a prior art steered laser system, and the problematic portions of the workpiece to be cut.

An example of an application where the depth of cut is important is a multi-layer film such as a decal. The decal must be cut through the adhesive material of the decal itself without cutting through the backing of the decal. FIG. 2 illustrates an example of an application performed by a prior art steered laser beam system, involving a simple rounded square cut of a multi-layer film such as a decal. Where uniform power was applied to the laser beam throughout cutting pattern 30, the backing of the decal was cut through in corner regions 32. This occurred because the velocity of the laser beam decreased in corner regions 32, causing the laser beam to be focused on a particular point in corner regions 32 lightly longer than for the straight portions of cutting pattern 30. As a result, the cut in corner regions 32 was deeper and wider than in the straight portions of cutting pattern 30, and the backing of the decal was undesirably cut through in corner regions 32. With existing technology, the only solution to this problem is to manually pre-program the desired laser power levels for each portion of the cutting pattern. This solution is extremely inefficient and time-consuming, particularly for cutting patterns having more complex geometries than the simple cutting pattern pictured in FIG. 2, and also does not address problematic power spikes that may occur when initially turning on the laser.

In laser systems that move on an x-y table, steps have been taken to anticipate approaching corners or starting score lines, to combat the non-uniform cut depth problem. Since x-y tables move at slow rates, one solution has been to pulse the laser beam, that is to turn it on and off intermittently. Intermittent pulsing of the laser works well in an x-y table application because the x-y table includes digital position feedback that can be used directly control the laser pulsing duty cycle, and also because of the relatively low velocities of movement involved. However, pulsing a laser beam in a high-speed steered laser beam system is not a viable solution due to optical and mechanical delays associated with delivering laser energy to the focal point, which become prohibitive problems at high focal point velocities, and because there is no position feedback signal to control a duty cycle of laser pulsing in a galvo laser system.

U.S. Pat. Nos. 5,340,962 and 5,428,280 by Schmidt et al. describe a laser machining system that controls the distance of the focal point of the laser beam from the machining nozzle tip to provide a constant distance from the tip to the workpiece to provide satisfactory cuts or welds. However, such a system does not address the problem of steering a laser beam at different cutting or welding speeds while providing a uniform depth cut or weld.

U.S. Pat. No. 4,160,894 by Stemmler et al. describes a steered laser beam system for cutting two-dimensional patterns on a moving web of material through the use of a lens that is supported on a rotatable movable lens carrier on which the lens is fixed eccentrically to the axis of rotation. However, the quality of the cut being produced by the beam is not addressed since the application is a through cut.

Therefore, there is a need in the art for a system that is able to achieve a uniform depth of cut in a high-speed steered laser system, despite nonuniform velocities of the focal point of the laser beam as it traverses a cutting pattern.

SUMMARY OF THE INVENTION

The present invention is a method for operating a steered laser beam system employing selective laser power control. A laser beam is provided having a selectively positionable focal point. A workpiece is provided on which a selected laser beam pattern is used to process the workpiece, and the laser beam focal point is controlled to travel along the selected pattern at varying velocities. A position of the focal point on the workpiece is dynamically determined as the focal point travels along the selected pattern. A velocity of the focal point on the workpiece is dynamically calculated based on multiple determined positions of the focal point. An energy level of the laser beam is controlled based on the calculated velocity of the focal point. In one embodiment, the energy level of the laser beam is adjusted to maintain a constant energy per unit distance traveled by the focal point.

DETAILED DESCRIPTION OF THE PREFERRED EMBODIMENTS

In steered laser beam systems in which the focal point is moved at variable speeds in two dimensions, and especially at velocities over 100 in/sec, problems arise in providing the correct intensity of energy at the focal point in order to perform the processing operation. For example, in a two-dimensional cutting application, in which precise scoring of a multi-layered film is needed and the laser beam path has turns or has a stop and start on the workpiece requiring adjustment of the velocity of the laser beam focal point, the cut quality on the workpiece may vary. A variation in the cut quality may have an undesirable effect both aesthetically and functionally on the workpiece. A high amount of energy per unit distance at the start of a score line or at a corner results in a wider or deeper cut than desired. Not enough energy per unit distance at a straight or high-velocity section of the laser beam path may result in an insufficient score line that does not extend deep enough into the multi-layered film.

In a high-speed steered laser beam system, optical and mechanical delays in the beam delivery system preclude implementing a solution involving pulsing of the laser beam, as is possible in a stationary laser beam system with an x-y table. The high velocities involved simply do not allow enough time for the laser beam to be intermittently turned on and off during the cutting procedure. Compensating for mechanical delays along with optical delays in high-speed applications, in which the speed of the focal point substantially varies, is extremely inefficient and effectively eliminates the option of pulsing the laser to control cut quality and depth.

The present invention controls the power of the laser beam at the focal point by adjusting the energy level or power delivered to the laser source. The goal in controlling the power of the laser beam when processing a workpiece in a two-dimensional laser beam path is to keep a constant energy per unit distance of the cut. Thus, power control must be related to the velocity of the focal point of the laser beam, which requires the actual velocity of the laser beam focal point to be calculated with a high degree of accuracy.

Figure 3:
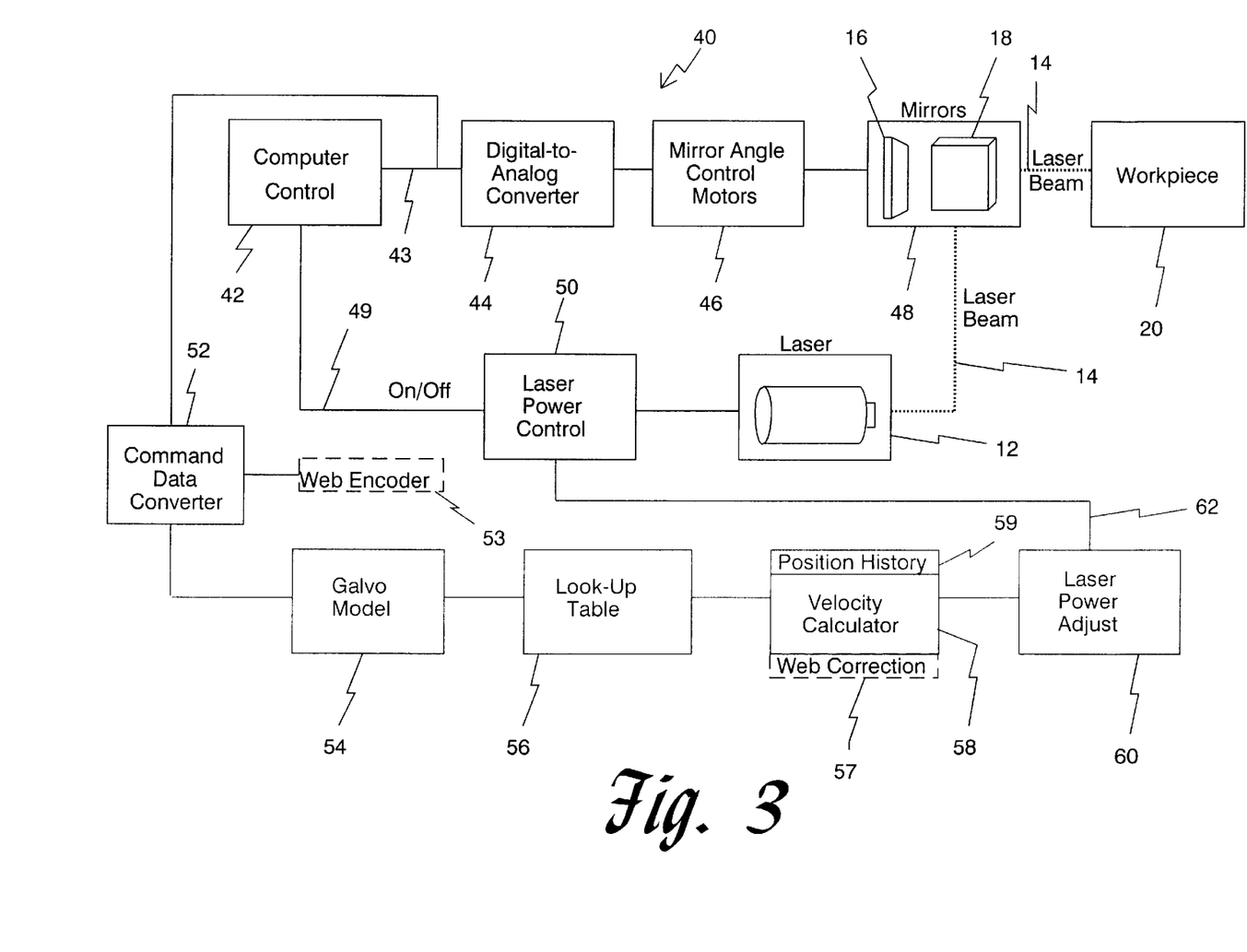
FIG. 3 is a block diagram illustrating the primary functional components of the power-controlled laser cutting system of the present invention.

FIG. 3 is a block diagram illustrating the primary functional components of power-controlled laser cutting system 40 of the present invention. Computer control 42 provides the general control signals to operate the system, including serial data signals on line 43 for providing a commanded mirror angle for the "x" and "y" galvo mirrors and a laser on/off control signal on line 49. Digital-to-analog converter 44 receives the serial data signals provided from computer control 42 and produces analog control signals for operating mirror angle control motors 46. These motors control the reflectance angles of galvo mirrors 48 (including "x" mirror 16 and "y" mirror 18) to focus laser beam 14 at a two-dimensional target position on workpiece 20. Laser power control 50 operates laser 12 upon receipt of a "laser on" signal on line 49 from computer control 42 to produce laser beam 14. Laser beam 14 is reflected through galvo mirrors 48 onto workpiece 20 in a desired cutting pattern (which is controlled by the mirror angles set by computer control 42).

According to the present invention, power-controlled laser cutting system 40 also includes a command data converter 52 coupled to the serial data signals on line 43 from computer control 42. Command data converter 52 converts the mirror angle commands from computer control 42 into readable data representing the commanded mirror angles for the "x" and "y" galvo mirrors. Optionally, web encoder 53 may be coupled to command data converter 52 to provide information pertaining to the velocity of a moving web of material passing through the laser system. Galvo model 54 is coupled to command data converter 52 to convert the commanded mirror angle data into data representing the actual angles of the "x" and "y" galvo mirrors. Galvo model 54 is necessary to determine the actual angles of the galvo mirrors because of the physical limitations of the system that limit the ability to instantaneously adjust the galvo mirrors to the commanded angles. The actual modeling performed by galvo model 54 is preferably accomplished by numerical analysis of infinite impulse filter response equations (or other similar mathematical modeling equations). In the infinite impulse filter response equations, the damping coefficient and ringing frequency parameters are set empirically according to actual physical responses of the laser system in response to step inputs, thereby customizing the model to the particular laser system being used. The details of the numerical analysis are not reproduced here for the sake of simplicity, as such calculations are within the expertise of one skilled in the art.

Once the actual angles of the galvo mirrors are determined by galvo model 54, the galvo mirror angles are input to look-up table 56 to determine the actual position of the focal point of laser beam 14 on workpiece 20. Look-up table 56 provides an "x" coordinate for a given angle of the "x" galvo mirror, and a "y" coordinate for a given angle of a "y" galvo mirror. Data representing the actual position of the laser beam focal point is then input to velocity calculator 58. Based on the current actual position of the laser beam focal point and at least one previous actual position stored in position history 59, velocity calculator 58 is able to determine the actual velocity of the laser beam focal point. This actual velocity may be compensated by web correction 57 for an application involving a moving web of material (the velocity of which would have been encoded in the command data by web encoder 53).

Laser power adjust 60 generates a control signal on line 62 to adjust the power provided to laser 12 by laser power control 50 based on the velocity information from velocity calculator 58. Specifically, laser power adjust 60 modifies the power delivered to laser 12 to ensure that the laser beam energy per unit of distance traveled on workpiece 20 is constant throughout the cutting pattern. In essence, this adjustment entails reducing the laser power for decreases in focal point velocity, which occur in corners and curves of the cutting pattern.

Figure 4A:
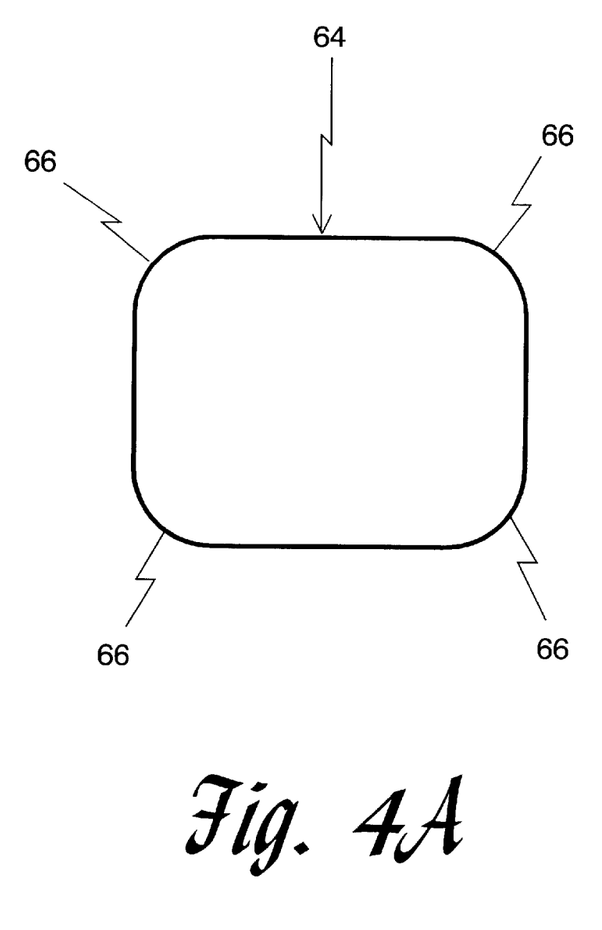
FIG. 4A is a diagram illustrating an exemplary cutting pattern application performed by the power-controlled steered laser beam system of the present invention.
Figure 4B:
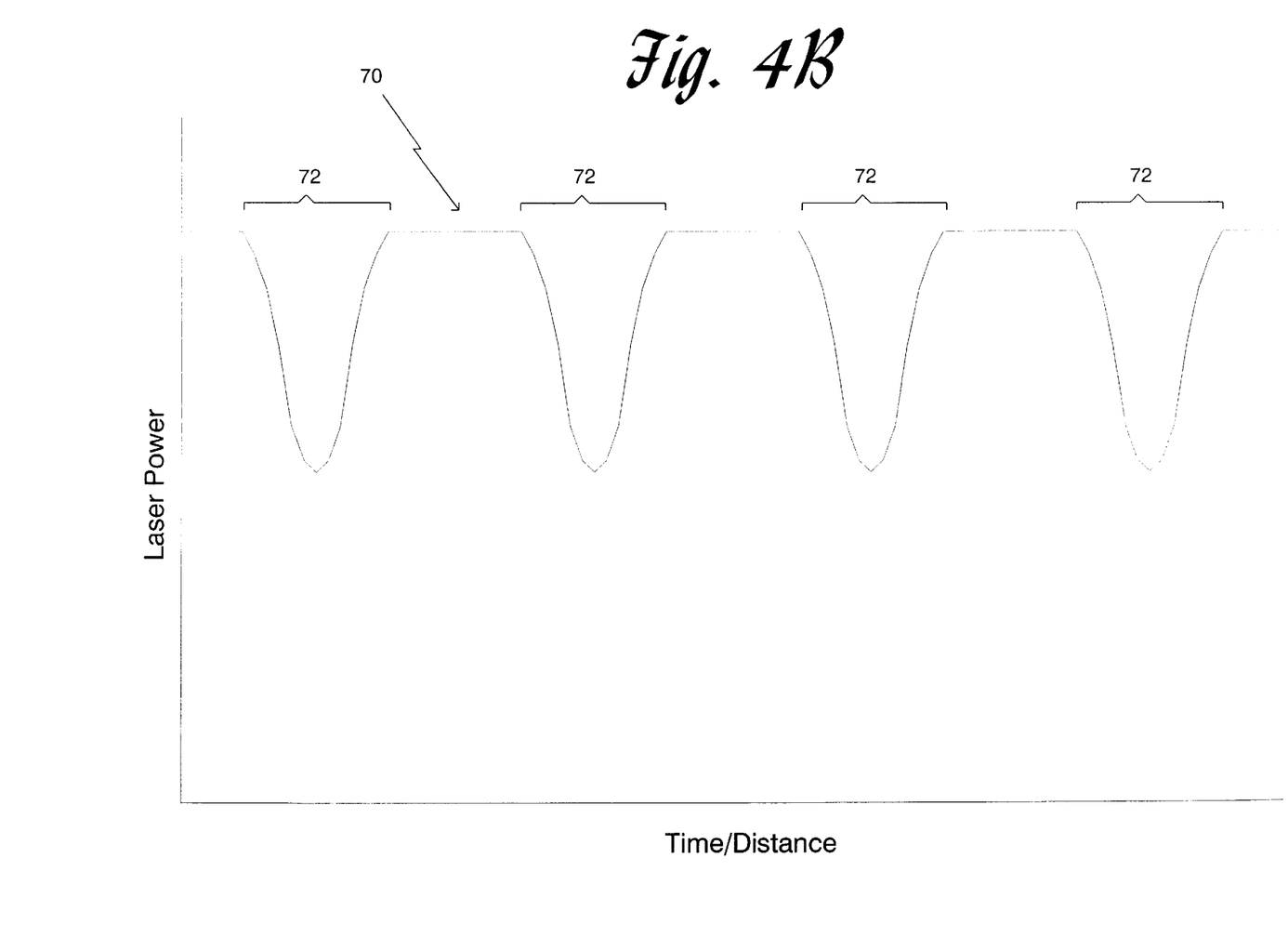
FIG. 4B is a graph illustrating a laser power level profile for the exemplary cutting pattern shown in FIG. 4A.

FIG. 4A is a diagram illustrating exemplary cutting pattern 64 performed by the power-controlled steered laser beam system of the present invention, and FIG. 4B is a graph illustrating laser power level profile 70 for exemplary cutting pattern 64 shown in FIG. 4A. The focal point of the laser beam is initially positioned on a straight portion of cutting pattern 64, and traverses the outline of cutting pattern 64 at a velocity that is computer-controlled. The velocity of the laser beam focal point is maximum for the straight portions of cutting pattern 64, and decreases as the laser beam focal point traverses corner portions 66. According to the power control scheme provided by the present invention and described above with respect to FIG. 3, laser power is automatically decreased in graph regions 72 as the focal point traverses corner portions 66, in response to the lower velocity of the focal point that is detected. As a result, cutting pattern 34 is completed with a uniform cut depth and width, since the present invention is able to ensure that the laser beam energy per unit distance traveled remains constant despite varying focal point velocity. It will be appreciated that laser power profile 70 is one example of a profile for specific cutting pattern 64 shown in FIG. 4A, and the profile will vary with respect to other cutting patterns and their associated varying focal point velocities.

According to another feature of the present invention, the power control system shown in FIG. 3 may also be utilized to compensate for the initially low velocity and the undesirable power spikes in the laser response upon initiating movement on the workpiece. Specifically, many steered laser beam systems experience a problem with a laser power spike at the beginning of a cutting pattern. Laser power control 50 is configured according to the present invention to remedy this problem. Specifically, upon initially receiving a "laser on" signal on line 49 from computer control 42, laser power control 50 initially delivers power to laser 12 with a maximum duty cycle but at a power magnitude that is less than what the velocity of the galvo mirrors and the laser beam focal point would otherwise dictate. As a result, the laser power spike does not reach a critically high magnitude that would cause a deeper and wider cut at the laser turn-on location. The power magnitude delivered from laser power control 50 to operate laser 12 is returned to its regular value after the transient power spike, and the laser system operates normally thereafter. This solution allows the potentially undesirable effect of initial laser power spikes to be averted without adding delays to wait for the galvo mirrors to reach full velocity, improving the overall efficiency of the laser system.

The present invention provides a system in a steered laser machining device for automatically compensating laser power according to the velocity of the laser beam focal point. Once empirical modeling is initially performed to account for the particular characteristics of the laser machining device, the velocity of the laser beam focal point is determined dynamically as the laser beam focal point traverses a cutting pattern on the workpiece. The power adjustment provided by the present invention is able to maintain the laser power per unit of distance traveled by the focal point at a constant value, ensuring a uniform cut depth and width despite varying focal point velocities. By performing the power adjustment in real-time, the present invention alleviates the need to pre-program any necessary power adjustments into each computer control program that regulates the shape of the cutting pattern and the focal point velocity, thereby saving significant programming time and effort and providing an efficient, versatile laser machining system. While the details of present invention have been described above with respect to a two-dimensional galvo system, those skilled in the art will appreciate that the invention is also applicable to three-dimensional steered laser beam systems and to other types of steered laser beam systems.

Although the present invention has been described with reference to preferred embodiments, workers skilled in the art will recognize that changes may be made in form and detail without departing from the spirit and scope of the invention.

What is claimed is:

1. A method for operating a steered laser beam system, the method comprising:

generating a laser beam having a selectively positionable focal point;

reflecting the laser beam through a plurality of galvo mirrors having controllable reflectance angles for positioning the focal point of the laser beam on the workpiece in at least two dimension;

providing a workpiece on which a selected laser beam pattern is used to process the workpiece, the laser beam focal point being controlled to travel along the selected pattern at varying velocities;

performing a galvo model to determine a set of actual galvo mirror angles based on a set of commanded galvo mirror angles and empirically selected model parameters;

dynamically determining for the set of actual galvo mirror angles a position of the focal point on the workpiece as the focal point travels along the selected pattern;

dynamically calculating a velocity of the focal point on the workpiece based on multiple determined positions of the focal point; and controlling an energy level of the laser beam based on the calculated velocity of the focal point.

2. The method of claim 1, wherein the step of controlling the energy level of the laser beam comprises maintaining a constant energy per unit distance traveled by the focal point.

3. The method of claim 1, wherein the step of providing the workpiece comprises advancing a web of material through the steered laser beam system at a web velocity, the selected laser beam pattern being used to process the web of material.

4. The method of claim 3, further comprising:

compensating the calculated velocity of the focal point on the workpiece for the web velocity.

5. The method of claim 1, wherein the step of performing the galvo model comprises analyzing a galvo mirror response according to an infinite impulse filter response model.

6. The method of claim 1, further comprising:

temporarily adjusting the energy level of the laser beam upon initially turning on a laser source to provide the laser beam.

7. A method for operating a steered laser beam system, the method comprising:

generating a laser beam having a selectively positionable focal point;

reflecting the laser beam through a plurality of galvo mirrors having controllable reflectance angles for positioning the focal point of the later beam on the workpiece in at least two dimensions;

providing a workpiece on which a selected laser beam pattern is used to process the workpiece, the laser beam focal point being controlled to travel along the selected pattern at varying velocities;

performing a galvo model to determine a set of actual galvo mirror angles based on a set of commanded galvo mirror angles and empirically selected model parameters;

determining a position of the focal point of the laser beam corresponding to the set of actual galvo mirror angles;

calculating a velocity of the focal point on the workpiece based on multiple determined positions of the focal point; and controlling an energy level of the laser beam to maintain energy at the focal point constant per unit of distance traveled by the focal point of the laser beam by adjusting the energy level of the laser beam based on the calculated velocity of the focal point.

8. The method of claim 7, wherein the step of performing the galvo model comprises analyzing a galvo mirror response as an infinite impulse filter response model.

9. The method of claim 7, wherein the step of providing the workpiece comprises advancing a web of material through the steered laser beam system at a web velocity, the selected laser beam pattern being used to process the web of material.

10. The method of claim 9, further comprising:
compensating the calculated velocity of the focal point on the workpiece for the web velocity.

11. The method of claim 7, further comprising:
temporarily adjusting the energy level of the laser beam upon initially turning on a laser source to provide the laser beam.

* * * * *

UNITED STATES PATENT AND TRADEMARK OFFICE
CERTIFICATE OF CORRECTION

| | | |
|---|---|---|
| PATENT NO. | : 6,177,648 B1 | Page 1 of 1 |
| APPLICATION NO. | : 09/280535 | |
| DATED | : January 23, 2001 | |
| INVENTOR(S) | : William E. Lawson | |

It is certified that error appears in the above-identified patent and that said Letters Patent is hereby corrected as shown below:

On the Title Page ITEM (56), under FOREIGN PATENT DOCUMENTS, delete "59-9215291", insert -- 59-215291 --

On the Title Page ITEM (56), under FOREIGN PATENT DOCUMENTS, insert -- 0 495 647 A1 * 07/92 (EP) 26/08 --

Signed and Sealed this

Second Day of January, 2007

JON W. DUDAS
*Director of the United States Patent and Trademark Office*